(12) United States Patent
Laarz et al.

(10) Patent No.: US 7,666,349 B2
(45) Date of Patent: Feb. 23, 2010

(54) METHOD OF GEL-CASTING A CEMENTED CARBIDE BODY SLURRY AND GELLED BODY

(75) Inventors: Eric Laarz, Västerås (SE); Karin Andersson, Stockholm (SE)

(73) Assignee: Sandvik Intellectual Property AB, Sandviken (SE)

( * ) Notice: Subject to any disclaimer, the term of this patent is extended or adjusted under 35 U.S.C. 154(b) by 580 days.

(21) Appl. No.: 11/649,888

(22) Filed: Jan. 5, 2007

(65) Prior Publication Data

US 2007/0186721 A1 Aug. 16, 2007

(30) Foreign Application Priority Data

Jan. 9, 2006 (SE) .................................. 0600029

(51) Int. Cl.
*C04B 35/636* (2006.01)
*C04B 35/56* (2006.01)
*C08L 51/06* (2006.01)

(52) U.S. Cl. .............................. 419/40; 419/18; 419/63; 516/78; 264/621

(58) Field of Classification Search ................... 516/78, 516/95; 419/18, 40, 62, 63; 264/603, 683, 264/621
See application file for complete search history.

(56) References Cited

U.S. PATENT DOCUMENTS

| | | | |
|---|---|---|---|
| 2,698,232 | A | 12/1954 | Golibersuch |
| 3,351,688 | A | 11/1967 | Kingery et al. |
| 4,894,194 | A | 1/1990 | Janney |
| 5,028,362 | A | 7/1991 | Janney et al. |
| 5,145,908 | A | 9/1992 | Janney et al. |
| 6,066,279 | A | 5/2000 | Walls et al. |
| 6,228,299 | B1 * | 5/2001 | Janney et al. ............... 264/118 |
| 2002/0010219 | A1 * | 1/2002 | Bergstrom et al. ............ 516/98 |
| 2009/0113810 | A1 * | 5/2009 | Laarz et al. .................... 51/309 |

FOREIGN PATENT DOCUMENTS

| | | |
|---|---|---|
| EP | 0 737 656 | 10/1996 |
| EP | 1 153 652 | 11/2001 |
| EP | 1 440 956 | 7/2004 |

OTHER PUBLICATIONS

E. Laarz and L. Bergstrom, The effect of anionic polyelectrolytes on the properties of aqueous silicon nitride suspensions, Journal of the European Ceramic Society, vol. 20 (2000), p. 431-440.*
L. Chongzhi et al. The Compatibility of Polycarboxylate-Type Superplasticizers with Cement. Journal of Wuhan University of Technology—Mater. Sci. Ed., vol. 20, No. 3, Sep. 2005, p. 95-98.*
A. M. Kjeldsen et al.—Relating the molecular structure of comb-type superplasticizers to the compression rheology of MgO suspensions. Cement and Concrete Research, vol. 36, (2006), p. 1231-1239.*
E. Laarz et al.—Dispersing Multi-Component and Unstable Powders in Aqueous Media Using Comb-Type Anionic Polymers, Journal of American Ceramic Society, vol. 89, No. 6, (Published Online: May 8, 2006), p. 1847-1852.*
Sigmund et al., "Novel Powder-Processing Methods for Advanced Ceramics," J. Am. Ceram. Soc., 83 (7), 2000, pp. 1557-1574.
Janney et al., "Development of Low-Toxicity Gelcasting Systems," J. Am. Ceram. Soc., 81(3), 1998, pp. 581-591.

* cited by examiner

*Primary Examiner*—George Wyszomierski
*Assistant Examiner*—Mark L Shevin
(74) *Attorney, Agent, or Firm*—Drinker Biddle & Reath LLP

(57) ABSTRACT

The present invention provides a method of gel-casting WC—Co cemented carbide powder, where the resulting gelled body can be of complex shape and has a high green density, a good homogeneity and sufficiently good mechanical properties for the gelled body to be demolded and dried without significant shape-distortions and cracking. The method relates to the forming of a gelled body through the gelling of an aqueous slurry of WC—Co cemented carbide powder with good dispersion characteristics, where the gelling is achieved by the temperature induced polymerization reaction between a monomer and a cross-linker, catalyzed by a free-radical initiator. By further subjecting the body to drying, heating, and sintering, a dense cemented carbide body is obtained.

22 Claims, No Drawings

METHOD OF GEL-CASTING A CEMENTED CARBIDE BODY SLURRY AND GELLED BODY

BACKGROUND OF THE INVENTION

This invention relates generally to gel-casting and more particularly to gel-casting of well dispersed aqueous slurry mixtures of powders for WC—Co cemented carbides with high solids loading.

Cemented carbide is a class of materials used in applications where, e.g., high wear resistance is desired. Products of cemented carbide includes inserts for turning, milling or hole making, as well as solid carbide drills, cutting blades and dies used for, e.g., wire drawing. The geometry of the mentioned products can be more or less complex. Different methods exist for forming cemented carbide powders into complex shapes. The methods include processing steps where the powder is by some means transformed to a powder compact, followed by a heat treatment during which the compact forms a solid cemented carbide body. Machining of a solid cemented carbide body to desired shape and dimension is time consuming and expensive and does not always offer enough flexibility. Kingery et al U.S. Pat. No. 3,351,688 discloses a method wherein a refractory powder is mixed with a paraffin binder at a temperature where the binder is liquid, and the resulting mixture is cast into a mold of the desired shape. The viscosities of these mixtures are often such that significant pressure is needed in order to fill the cavity of the mold. The molds are therefore often made of a wear resistant material which makes them time consuming and expensive to manufacture. It would be of great interest if a cemented carbide mixture could be made with such viscosity that the mixture could be cast in a mold made of a material cheap to manufacture. One method of forming complex shapes of cemented carbide powder is gel-casting. The process involves the transition of a system from a liquid suspension into a solid, where the liquid has a viscosity suitable for casting at low applied pressures.

Different organic systems for gel-casting exist, using, e.g., starch gelling, denaturing of proteins or polymerization, Sigmund, Bell and Bergström, "Novel Powder-Processing Methods for Advanced ceramics", J. Am. Ceram. Soc., 83, 1557, 2,000.

In the case of polymerization, the gel-casting process comprises adding to a powder slurry a polymerizing system, and by subjecting the resulting mixture to, e.g., an increase in temperature, such that the components of the polymerizing system undergo a transition to a solid gel.

Golibersuch, U.S. Pat. No. 2,698,232, discloses casting of thixotropic slurries of cemented carbide and polymerizable agents in organic solvent. The solidification or the hardening of the slurries is controlled by the formation of a gel of the soluble polymerizable agents, e.g., unsaturated polyesters and vinyl derivatives. The polymerization is initiated by the addition of a catalyst and increasing temperature. Golibersuch discloses casting mixtures containing 38-41.5% by volume of cemented carbide powder.

In U.S. Pat. No. 4,894,194, Janney describes a method for gel-casting ceramic powders in organic solvent. In U.S. Pat. Nos. 5,028,362 and 5,145,908, Janney and Omatete disclose the gel-casting of ceramic particles in aqueous solvent, using as the polymerizing vehicle at least one monofunctional monomer and at least one difunctional monomer; the functional groups of these monomers being selected from vinyl or allyl groups. In U.S. Pat. No. 6,066,279 Walls et al disclose a method for forming a gel-cast body of inorganic powder, specifically ceramic powders, without the use of a cross-linking agent, in an aqueous solution. In U.S. Pat. No. 6,228,299, Janney and Walls disclose the use of a plasticizer for improved drying behavior and machinability when gel-casting an inorganic powder using a monomer system.

A critical parameter in gel-casting is the solids loading. A higher solids loading means less segregation of powder in the slurry; a higher density and strength of the green body; less risk of drying cracks when the part is dried; and less shrinkage, thus less form and dimension distortions during sintering. A solids loading of at least 50% by volume is desired, Janney et al., "Development of Low-Toxicity Gelcasting Systems, J. Am. Ceram. Soc., 81, 581, 1998. Optimal gel-casting systems are characterized by a high solids loading and a low viscosity of the slurry. Since the low viscosity is necessary to make the mixture easy to handle and to cast into a mold before gelling, the dispersion of the slurry is a critical issue. For ceramic applications, several dispersants are commercially available and their use is relatively straight-forward.

In the case of WC—Co cemented carbide powders, Bergström and Laarz, US 2002/010219 describe how the surface chemistry of the WC and Co particles makes cemented carbide powders difficult to disperse in polar solvents. In aqueous solution, the WC particles will be covered by an acidic surface oxide, $WO_3$, whereas CoO at the Co-particle surfaces is alkaline. They disclose the use of a cationic polyelectrolyte, polyethyleneimine (PEI), as a dispersant for the fabrication of well dispersed aqueous or ethanol based slurries of cemented carbide powders, which gives a significant decrease of the slurry viscosity as compared to formerly known techniques.

Compared to ethanol based slurries, aqueous slurries present the advantages of being easier to handle since there is no risk of explosions, as well as being environmentally harmless.

However, as the polymerizing system, as well as dispersed slurries of WC—Co cemented carbide powder, consist of several different components, which can interact with each other in different ways, this can lead to unwanted mixture characteristics as well as an obstruction of the gelling process or an unsatisfying gel quality. When applied to aqueous slurries of WC—Co cemented carbide powders, the polymerizing systems suggested by the above mentioned documents either fail to gel or give gels of insufficient mechanical strength. Premature gelling, making the process very difficult to control, is another problem related to such interactions.

OBJECTS AND SUMMARY OF THE INVENTION

It is an object of the present invention to provide gel-casting compositions and methods of gel-casting, which apply to aqueous slurries of WC—Co cemented carbide powders with high solids loading and good dispersion characteristics, and which permit the casting of complex shaped articles with good homogeneity.

It is another object of the invention to provide a gel-casting formulation such that the gelled body can be demolded and dried without inducing cracks.

It is another object of the invention to provide gel-casting compositions such that the gelling process is controllable in industrial conditions.

It is another objective of the invention to provide well dispersed slurries of WC—Co cemented carbide powders in aqueous media characterized by high solids loading, low viscosity and long-term stability.

In one aspect of the invention, there is provided an aqueous WC—Co cemented carbide slurry wherein the slurry comprises a WC—Co powder containing from about 3 to about 20 wt % Co, and a comb-copolymer dispersant with an anionic backbone having carboxylic and/or sulphonate groups and poly(ethylene oxide)-based chains grafted onto the backbone.

In another aspect of the invention, there is provided a gelled body comprising WC—Co cemented carbide powder in an aqueous medium in an amount above about 42 percent by volume, the WC—Co cemented carbide powder containing from about 3 to about 20 wt % Co, a comb-copolymer dispersant in an amount between about 0.05 and about 5 wt % with regard to dry powder weight, with an anionic backbone having carboxylic and/or sulphonate groups and poly(ethylene oxide)-based chains of variable length grafted onto the backbone, the reaction product of a monofunctional monomer (2-dimethylamino)ethyl methacrylate, a cross-linker and an initiator of azo-type, the total amount of monomer and cross-linker being from about 10 to about 35 wt % relative to the weight of the aqueous medium, the monomer/cross-linker weight ratio being from about 1:3 to about 10:1, and the amount of initiator being from about 0.05 to about 5 wt % with regard to the total weight of monomer and cross-linker.

In still another aspect of the invention, there is provided a method of producing a gelled body comprising forming a slurry by mixing in an aqueous medium, above about 42 percent by volume, WC—Co cemented carbide powder containing from about 3 to about 20 wt % and between about 0.05 and about 5 wt % with regard to dry powder weight, comb-copolymer dispersant with an anionic backbone having carboxylic and/or sulphonate groups and poly(ethylene oxide)-based chains of variable length grafted onto the backbone, forming a mixture by adding to said slurry from about 10 to about 35 wt %, relative to the weight of the aqueous medium, of a polymerizing system comprising a monofunctional monomer of (2-dimethylamino)ethyl methacrylate, a cross-linker of N,N'-methylenebisacrylamide, and from about 0.05 to about 5 wt % with regard to the total weight of monomer and cross-linker, of an initiator of azo-type, the monomer/cross-linker weight ratio being from about 1:3 to about 10:1, pouring or squeezing said mixture in fluid condition into a mold of desired shape, increasing the temperature to a temperature sufficient to induce the polymerization of the polymerizing system for a time sufficient to consolidate the mixture into a shaped body and removing the body from the mold.

In yet another aspect of the invention, there is provided a method of producing a sintered cemented carbide body comprising forming a slurry by mixing in an aqueous medium above about 42 percent by volume WC—Co cemented carbide powder containing from about 3 to about 20 wt % Co, and the remaining WC and between about 0.05 and about 5 wt % with regard to dry powder weight, with a comb-copolymer dispersant with an anionic backbone having carboxylic and/ or sulphonate groups and poly(ethylene oxide)-based chains of variable length grafted onto the backbone, forming a mixture by adding to said slurry from about 10 to about 35 wt % relative to the weight of the aqueous medium, of a polymerizing system comprising a monofunctional monomer of (2-dimethylamino)ethyl methacrylate, a cross-linker of N,N'-methylenebisacrylamide and from about 0.05 to about 5 wt %, with regard to the total weight of monomer and cross-linker, of an initiator of azo-type, the monomer/cross-linker weight ratio being from about 1:3 to about 10:1, pouring or squeezing said mixture in fluid condition into a mold of desired shape, increasing the temperature to a temperature sufficient to induce the polymerization of the polymerizing system for a time sufficient to consolidate the mixture into a shaped body, removing the body from the mold, drying the body to substantially remove the aqueous medium, heating said body to remove the components of the polymerizing system and performing a conventional sintering operation whereby an essentially dense cemented carbide body is obtained.

DETAILED DESCRIPTION OF THE PREFERRED EMBODIMENTS

The present invention provides a method of gel-casting WC—Co cemented carbide powder, where the resulting gelled body can be of complex shape and has a high green density, a good homogeneity and sufficiently good mechanical properties for the gelled body to be demolded and dried without significant shape-distortions and cracking. The method relates to the forming of a gelled body through the gelling of an aqueous slurry of WC—Co cemented carbide powder with good dispersion characteristics, where the gelling is achieved by the temperature induced polymerization reaction between a monomer and a cross-linker, catalyzed by a free-radical initiator.

More specifically, the method according to the present invention comprises the forming of a slurry including WC—Co cemented carbide powder and dispersant in an aqueous medium, to which is added a monofunctional monomer, a cross-linker and a suitable initiator for the system.

The aqueous slurry should contain WC—Co cemented carbide powder in an amount from about above 42 percent by volume, preferably above from about 50 percent by volume, but preferably below from about 75 percent by volume, the WC—Co cemented carbide powder being constituted of from about 3 to about 20 wt %, preferably from about 5 to about 15 wt % Co, and possibly up to about 25 wt % other carbides, such as TaC, NbC, $Cr_3C_2$, and the remaining part being WC. According to the invention, said solids loading of the slurry is achieved by the use of a comb-copolymer dispersant with an anionic backbone, having carboxylic and/or sulphonate groups that render the polymer a negative charge in polar media, and un-charged poly(ethylene oxide) (PEO)-based chains of variable length grafted onto the anionic backbone. The molecular weight of said comb-polymer is from about 2,000 to about 60,000, preferably from about 10,000 to about 40,000. Such a dispersant is commercially available, for example, from the Takemoto Fat & Oil Co. Ltd, Japan as Chupol SSP-104. The dispersant is used at concentrations between about 0.05 and about 5 wt %, preferably between about 0.1 and 2.5 wt %, most preferably between about 0.1 and about 0.5 wt %, with regard to dry powder weight.

To the slurry is added the polymerizing system, i.e., the monomer and cross-linker, which should be soluble in the aqueous medium and not show any unwanted interactions with the WC—Co cemented carbide powder, the dispersant or each other at the mixing temperature. The polymerizing system should not induce premature gelling of the powder slurry with time at ambient temperatures below the desired gelation temperature. The polymerizing system according to the present invention comprises the monofunctional monomer (2-dimethylamino)ethyl methacrylate, the cross-linker (N,N'-methylenebisacrylamide) and an initiator of azo-type, preferably 4,4'-azobis(4-cyanovaleric acid). The total amount of monomer and cross-linker is from about 10 to about 35 wt %, preferably from about 15 to about 25 wt %, relative to the weight of the aqueous medium, and the monomer/cross-linker weight ratio is from about 1:3 to about 10:1, preferably from about 1:1 to about 3:1. The amount of initiator is from about 0.05 to about 5 wt %, preferably from about 0.1 to about 2 wt %, most preferably from about 0.1 to about 1 wt %, with regard to the total weight of monomer and cross-linker.

The components of the mixture can be combined in any suitable manner.

In a preferred embodiment, the powder slurry is prepared by dissolving the dispersant in deionized water, then adding a composite WC—Co powder or WC, Co and carbide powders and mixing according to conventional methods such as blending, milling etc. in order to homogenize the slurry and to achieve the desired properties of the material. The monomer, cross-linker and initiator are thereafter added to the slurry.

The viscosity of the resulting mixture should generally be sufficiently low to enable filling of a mold of complex shape, i.e., less than about 50 Pa s, preferably less than about 30 Pa s, but preferably above about 10 mPa s, at a shear rate of 13 $s^{-1}$.

The mixture is then poured or squeezed in fluid condition into a mold of desired shape, and the temperature is increased to a temperature sufficient to induce the polymerization of the polymerizing system, preferably from about 55 to about 90° C., most preferably from about 65 to about 85° C., for a time sufficient to consolidate the mixture into a shaped body, the time being dependent on the dimensions of the body. The body is then removed from the mold.

In a preferred embodiment of the invention, the demolded solid shaped body is transferred to a drying chamber with controlled atmosphere to be dried for a time sufficient to substantially remove the aqueous medium. The dried body is then heated to remove the components of the polymerizing system and then sintered at high temperature to provide an essentially dense body, according to methods that are known to those skilled in the art.

In a preferred embodiment, said sintered WC—Co cemented carbide body is a cutting tool.

The invention also provides a gelled body, comprising WC—Co cemented carbide powder in an aqueous medium in an amount above about 42 percent by volume, preferably above about 50 percent by volume, but preferably below about 75 percent by volume, the WC—Co cemented carbide powder containing from about 3 to about 20 wt %, preferably from about 5 to about 15 wt % Co, and possibly up to about 25 wt % other carbides, such as TaC, NbC, $Cr_3C_2$, and the remaining part being WC. According to the invention, said gelled body contains a comb-copolymer with an anionic backbone, having carboxylic and/or sulphonate groups that render the polymer a negative charge in polar media, and un-charged poly(ethylene oxide) (PEO)-based chains of variable length grafted onto the anionic backbone. The molecular weight of said comb-polymer is from about 2,000 to about 60,000, preferably from about 10,000 to about 40,000. The dispersant is present at concentrations between about 0.05 and about 5 wt %, preferably between about 0.1 and about 2.5 wt %, most preferably between from about 0.1 to about 0.5 wt %, with regard to dry powder weight. The gelled body according to the invention further comprises the reaction product of a monofunctional monomer (2-dimethylamino)ethyl methacrylate, the cross-linker (N,N'-methylenebisacrylamide) and an initiator of azo-type, preferably 4,4'-azobis(4-cyanovaleric acid). The total amount of monomer and cross-linker is from about 10 to about 35 wt %, preferably from about 15 to about 25 wt %, relative to the weight of the aqueous medium, and the monomer/cross-linker weight ratio is from about 1:3 to about 10:1, preferably from about 1:1 to about 3:1. The amount of initiator is from about 0.05 to about 5 wt %, preferably from about 0.1 to about 2 wt %, most preferably from about 0.1 to about 1 wt %, with regard to the total weight of monomer and cross-linker.

The invention also provides a well dispersed aqueous slurry of WC—Co cemented carbide powder, which contains WC—Co cemented carbide powder in an amount above about 42 percent by volume, preferably above about 50 percent by volume, but preferably below about 75 percent by volume, the WC—Co cemented carbide powder being constituted from about 3 to about 20 wt %, preferably from about 5 to about 15 wt % Co, and possibly up to about 25 wt % other carbides, such as TaC, NbC, $Cr_3C_2$, and the remaining part being WC. According to the invention said slurry contains a comb-copolymer with an anionic backbone, having carboxylic and/or sulphonate groups that render the polymer a negative charge in polar media, and un-charged poly(ethylene oxide) (PEO)-based chains of variable length grafted onto the anionic backbone. The molecular weight of said comb-polymer is from about 2,000 to about 60,000, preferably from about 10,000 to about 40,000. The dispersant is present at concentrations between from about 0.05 to about 5 wt %, preferably between from about 0.1 to about 2.5 wt %, most preferably between from about 0.1 to about 0.5 wt %, with regard to dry powder weight.

In a preferred embodiment, said slurry has a low viscosity of less than 30 Pa s, but preferably above 10 mPa s, at a shear rate of 13 $s^{-1}$.

The invention is additionally illustrated in connection with the following examples, which are to be considered as illustrative of the present invention. It should be understood, however, that the invention is not limited to the specific details of the examples.

EXAMPLE 1 (COMPARATIVE)

As a comparative example, a WC—Co cemented carbide green body having a solids loading of 45 percent by volume with regard to the volume of powder and the aqueous medium, was made by the following procedure. A liquid dispersion medium was made by dissolving 0.983 grams polyethyleneimine with a molecular weight of $M_w$=10,000 in 27.5 grams deionized water. A powder slurry was prepared by adding 270 grams of WC—Co cemented carbide RTP powder, constituted by 89.5 wt % WC, 10 wt % Co, 0.5 wt % $Cr_3C_2$, for which the PEG binder had been removed, to the liquid solution and by milling the slurry in a planetary ball mill for 30 minutes at 150 rpm. In the next step additional 40 grams WC—Co cemented carbide powder were added and the milling was continued for 15 minutes at 150 rpm. After adding additional 17.6 grams WC—Co cemented carbide powder and 4.87 grams methacrylamide, milling was continued for 20 minutes at 150 rpm. Then, 2.44 grams N,N'-methylenebisacrylamide and 0.3 grams of a 10 wt % ammonium persulfate aqueous solution were added and the mixture was milled for another 10 minutes at 150 rpm. The mixture preparation was completed after adding 0.1 grams N,N,N',N'-tetramethylethylenediamine and milling for 2 minutes at 150 rpm. The obtained mixture was cast in a mold and heated at 75° C. in air for 120 minutes. The resulting green body was very weak and suffered from severe deformation and cracking when removed from the mold.

In further tests, the methacrylamide monomer and N,N'-methylenebisacrylamide cross-linker were substituted with other mono and difunctional monomers, namely monomers 1-vinyl-2-pyrrolidinone, 4-vinyl-1,3-dioxolan-2-one, or N-methyl-N-vinylacetamide and cross-linkers poly(ethylene glycol)dimethacrylate, poly(ethylene glycol)diacrylate, neopentyl glycol dimethacrylate, triallylamine or diallyltartardiamide. The gel-cast bodies showed similarly unsatisfying mechanical properties as the above.

EXAMPLE 2 (COMPARATIVE)

As a comparative example, a gel-cast WC—Co cemented carbide green body having a solids loading of 45 percent by volume with regard to the volume of powder and the aqueous medium, was made by the following steps. A liquid dispersion medium was made by dissolving 0.983 grams polyethyleneimine with a molecular weight of $M_w$=10,000 in 27.5 grams deionized water. A powder slurry was prepared by adding 270 grams of WC—Co cemented carbide RTP powder, constituted by 89.5 wt % WC, 10 wt % Co, 0.5 wt % $Cr_3C_2$, for which the PEG binder had been removed, to the liquid solution and by milling the slurry in a planetary ball mill for 30 minutes at 150 rpm. After the first milling step, additional 40 grams WC—Co cemented carbide powder were added and the milling was continued for 15 minutes at 150 rpm. Then, the addition of 17.6 grams WC—Co cemented carbide powder and 4.87 grams 1-vinyl-2-pyrrolidinone was followed by 5 minutes milling at 150 rpm. Next, 0.17 grams of an aqueous 10 wt % 2,2'-azobis(2-methylpropionamidine) dihydrochloride solution was added and milling was continued for 2 minutes. The last step in the milling procedure was the addition of 2.44 grams N,N'-methylenebisacrylamide and milling for 5 minutes at 150 rpm. The obtained mixture exhibited significant premature gelation at ambient temperature and had to be cast in a mold within 15 minutes after preparation. After gelation at 75° C. in air for 120 minutes the resulting green body was demolded and dried for 1 week at 82% RH and 25° C. The as-cast green body was brittle and exhibited a significant tendency for cracking during drying.

EXAMPLE 3

As an example of dispersion of WC—Co cemented carbide powders in aqueous media, viscosity measurements were carried out on mixtures of WC—Co cemented carbide powders dispersed in water. When, according to prior art, 0.5 wt %, with respect to dry powder weight, of polyethyleneimine with 10,000 molecular weight, was used to disperse 45 vol % of a mixture of WC and Co, with a 9:1 WC/Co weight ratio, the viscosity showed a minimum of 32 Pa s at 13 $s^{-1}$ shear rate.

In a further test, the same 9:1 WC and Co powder mixture was dispersed according to the present invention by use of 0.2 wt % polycarboxylate ether dispersant Chupol SSP-104 from Takemoto Fat & Oil Co. Ltd, Japan. At a solids loading of 45 vol %, the resulting viscosity was 3.6 Pa s at 13 $s^{-1}$ shear rate.

EXAMPLE 4 (COMPARATIVE)

As an example of comparative gel-casting composition for well dispersed WC—Co cemented carbide powders, gel-cast WC—Co cemented carbide green bodies having a solids loading of 51 percent by volume with regard to the volume of powder and the aqueous medium, were prepared by the following steps. A liquid dispersion medium was made by mixing 3.22 g SSP-104, which is a 31 wt % aqueous stock-solution, with 18.9 g deionized water. A powder slurry was prepared by adding 280 grams of WC—Co cemented carbide RTP powder, constituted by 89.5 wt % WC, 10 wt % Co, 0.5 wt % $Cr_3C_2$, for which the PEG binder had been removed, to the liquid solution and by milling the slurry in a planetary ball mill for 90 minutes at 150 rpm. After the first milling step, additional 41.9 grams WC—Co cemented carbide powder was added and the milling was continued for 30 minutes at 150 rpm. Then, 3.94 g monofunctional monomer 1-vinyl-2-pyrrolidinone and 1.97 g cross-linker N,N'-methylenebisacrylamide were added and milling was continued for 15 minutes at 150 rpm. The last step in the milling procedure was the addition of 0.2 grams of a 10 wt % aqueous 4,4'-azobis (4-cyanovaleric acid) solution and milling for 5 minutes at 150 rpm. The obtained mixture was cast in a mold and heated at 75° C. in air for 120 minutes. The mixture exhibited significant premature gelation at ambient temperature. In addition, the gelled body exhibited a pronounced tendency for crack formation during drying.

In a further test, the monofunctional monomer 1-vinyl-2-pyrrolidinone was substituted for N-vinylacetamide. This mixture also exhibited significant premature gelation at ambient temperature as well as a pronounced tendency for crack formation during drying.

In a yet further test, the monofunctional monomer was substituted for methacrylamide. No or limited premature gelation was observed, but the gelled body exhibited a pronounced tendency for crack formation during drying at 82% RH and 25° C.

EXAMPLE 5

As an example of the improved gel-casting composition according to the invention, a gel-cast WC—Co cemented carbide green body, having a solids loading of 51 percent by volume with regard to the volume of powder and the aqueous medium, was produced according to the following steps. A liquid dispersion medium was made by mixing 3.22 g of a 31 wt % aqueous stock-solution of polycarboxylate ether dispersant SSP-104 from Takemoto Fat & Oil Co. Ltd, Japan, with 18.9 g deionized water. A powder slurry was prepared by adding 280 grams of WC—Co cemented carbide RTP powder, constituted by 89.5 wt % WC, 10 wt % Co, 0.5 wt % $Cr_3C_2$, for which the PEG binder had been removed, to the liquid solution and by milling the slurry in a planetary ball mill for 90 minutes at 150 rpm. After the first milling step, additional 41.9 grams WC—Co cemented carbide powder was added and the milling was continued for 30 minutes at 150 rpm. Then, 3.94 g 2-(dimethylamino)ethyl methacrylate and 1.97 g N,N'-methylenebisacrylamide were added and milling was continued for 15 minutes at 150 rpm. The last step in the milling procedure was the addition of 0.2 grams of a 10 wt % aqueous 4,4'-azobis(4-cyanovaleric acid) solution and milling for 5 minutes at 150 rpm. The obtained mixture had a low viscosity of 3.2 Pa s at 13 $s^{-1}$ shear rate and did not exhibit premature gelation at ambient temperature for at least 1 hour. The obtained mixture was cast in a mold and heated at 75° C. in air for 120 minutes. The as-cast green body had sufficient strength and toughness to allow demolding and drying for 1 week at 82% RH and 25° C. without the formation of drying defects. Resulting sintered bodies exhibited a homogeneous microstructure, essentially equivalent to WC—Co cemented bodies made with the use of conventional processing techniques.

EXAMPLE 6

As a further example of the improved gel-casting composition according to the invention, a gel-cast WC—Co cemented carbide green body, having a solids loading of 51 percent by volume with regard to the volume of powder and the aqueous medium, was produced according to the following steps. 32 g of Co powder and 200 g of WC powder were added to a liquid dispersion medium prepared by mixing 3.22 g of a 31 wt % aqueous stock-solution of polycarboxylate ether dispersant SSP-104 from Takemoto Fat & Oil Co. Ltd, Japan, with 18.9 g deionized water. The slurry was further milled for 2 hours at 150 rpm in a planetary ball mill before adding additional 90 g of WC powder. Then the polymerizing system of example 5 was added, and the resulting mixture was cast and gelled in the same manner as in example 5. The resulting green body was equivalent to the bodies of example 5, i.e., the as-cast green body had sufficient strength and toughness to allow demolding and drying for 1 week at 82% RH and 25° C. without the formation of drying defects.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A method of producing a gelled body comprising
forming a slurry by mixing in an aqueous medium
above about 42 percent by volume of WC—Co cemented carbide powder containing from about 3 to about 20 wt % Co and
between about 0.05 and about 5 wt % with regard to dry powder weight, of a comb-copolymer dispersant with an anionic backbone having carboxylic and/or sulphonate groups and poly(ethylene oxide)-based chains of variable length grafted onto the backbone,
forming a mixture by adding to said slurry from about 10 to about 35 wt % relative to the weight of the aqueous medium, of a polymerizing system comprising
a monofunctional monomer of (2-dimethylamino)ethyl methacrylate,
a cross-linker of N,N'-methylenebisacrylamide
and from about 0.05 to about 5 wt %, with regard to the total weight of monomer and cross-linker, of an initiator of azo-type,
the monomer/cross-linker weight ratio being from about 1:3 to about 10:1,
pouring or squeezing said mixture in fluid condition into a mold of desired shape,
increasing the temperature to a temperature sufficient to induce the polymerization of the polymerizing system for a time sufficient to consolidate the mixture into a shaped body, and
removing the body from the mold.

2. The method of claim 1 wherein said slurry comprises above about 50 percent by volume WC—Co cemented carbide powder, said powder containing from about 5 to about 15 wt % Co and up to about 25 wt % of other metal carbides.

3. The method of claim 1 wherein the comb-copolymer dispersant is present in an amount of from about 0.1 to about 2.5 wt %.

4. The method of claim 1 wherein the comb-copolymer dispersant is present in an amount of from about 0.1 to about 0.5 wt %.

5. The method of claim 1 wherein the polymerizing system is added to the slurry in an amount of from about 15 to about 25 wt %.

6. The method of claim 1 wherein said initiator is present in an amount of from about 0.1 to about 2 wt %.

7. The method of claim 1 wherein said initiator is present in an amount of from about 0.1 to about 1 wt %.

8. The method of claim 1 wherein said initiator is 4,4'-azobis(4-cyanovaleric acid).

9. The method of claim 1 wherein the monomer/cross-linker weight ratio is from about 1:1 to about 3:1.

10. The method of claim 1 wherein said temperature to induce polymerization is from about 55 to about 90° C.

11. The method of claim 1 wherein said temperature to induce polymerization is from about 65 to about 85° C.

12. A method of producing a sintered cemented carbide body comprising
forming a slurry by mixing in an aqueous medium
above about 42 percent by volume WC—Co cemented carbide powder containing from about 3 to about 20 wt % Co, and
between about 0.05 and about 5 wt % with regard to dry powder weight, of a comb-copolymer dispersant with an anionic backbone having carboxylic and/or sulphonate groups and poly(ethylene oxide)-based chains of variable length grafted onto the backbone,
forming a mixture by adding to said slurry from about 10 to about 35 wt % relative to the weight of the aqueous medium, of a polymerizing system comprising
a monofunctional monomer of (2-dimethylamino)ethyl methacrylate,
a cross-linker of N,N'-methylenebisacrylamide,
and from about 0.05 to about 5 wt %, with regard to the total weight of monomer and cross-linker, of an initiator of azo-type,
the monomer/cross-linker weight ratio being from about 1:3 to about 10:1,
pouring or squeezing said mixture in fluid condition into a mold of desired shape,
increasing the temperature to a temperature sufficient to induce the polymerization of the polymerizing system for a time sufficient to consolidate the mixture into a shaped body,
removing the body from the mold,
drying the body to substantially remove the aqueous medium,
heating said body to remove the components of the polymerizing system and,
performing a conventional sintering operation whereby an essentially dense cemented carbide body is obtained.

13. The method of claim 12 wherein said slurry comprises above about 50 percent by volume WC—Co cemented carbide powder, said powder containing from about 5 to about 15 wt % Co and up to about 25 wt % of other metal carbides.

14. The method of claim 12 wherein the comb-copolymer dispersant is present in an amount of from about 0.1 to about 2.5 wt %.

15. The method of claim 12 wherein the comb-copolymer dispersant is present in an amount of from about 0.1 to about 0.5 wt %.

16. The method of claim 12 wherein the polymerizing system is added to the slurry in an amount of from about 15 to about 25 wt %.

17. The method of claim 12 wherein said initiator is present in an amount of from about 0.1 to about 2 wt %.

18. The method of claim 12 wherein said initiator is present in an amount of from about 0.1 to about 1 wt %.

19. The method of claim 12 wherein said initiator is 4,4'-azobis(4-cyanovaleric acid).

20. The method of claim 12 wherein the monomer/cross-linker weight ratio is from about 1:1 to about 3:1.

21. The method of claim 12 wherein said temperature to induce polymerization is from about 55 to about 90° C.

22. The method of claim 12 wherein said temperature to induce polymerization is from about 65 to about 85° C.

* * * * *